United States Patent [19]

Miller

[11] E Re. 30,069

[45] Reissued Aug. 7, 1979

[54] MULTIPLE RANGING DME

[75] Inventor: Wayne L. Miller, Stanhope, N.J.

[73] Assignee: The Cessna Aircraft Corporation, Wichita, Kans.

[21] Appl. No.: 904,727

[22] Filed: May 10, 1978

Related U.S. Patent Documents

Reissue of:

[64] Patent No.: 4,035,801
Issued: Jul. 12, 1977
Appl. No.: 646,817
Filed: Jan. 6, 1976

[51] Int. Cl.[2] ..... G01S 9/04

[52] U.S. Cl. ..... 343/12 R; 343/7.3

[58] Field of Search ..... 343/12 R, 7.3, 7 A

[56] References Cited

U.S. PATENT DOCUMENTS

| | | | |
|---|---|---|---|
| 2,790,166 | 4/1957 | Buehrle, Jr. et al. | 343/7.3 |
| 2,912,686 | 11/1959 | Dodington et al. | 343/7.3 |
| 3,239,834 | 3/1966 | Lucchi | 343/7.3 |
| 3,377,590 | 4/1968 | Wendell | 343/12 R |
| 3,725,920 | 4/1973 | Kupfer et al. | 343/12 R |

*Primary Examiner*—Charles T. Jordan
*Attorney, Agent, or Firm*—Beveridge, De Grandi, Kline & Lunsford

[57] ABSTRACT

A method and system for obtaining and displaying distance information to multiple DME ground stations using a single airborne transmitter-receiver and for displaying groundspeed to one of the stations. A DME is time multiplexed between two channels and display-memory means, the distance value being held in the display corresponding to each channel until that channel and the display corresponding thereto is updated or until a predetermined period of time has elapsed. Further, a DME which provides a distance data output in both search and track modes is multiplexed between primary and secondary channels and display-memory means, and is permitted to go into track on the primary channel but only into search on the secondary channel. When the system is on the secondary channel appropriate information is stored and the DME is returned to primary channel operation in the track mode.

20 Claims, 14 Drawing Figures

RANGE GATE GENERATOR & SEARCH TRACK SWITCH

CYCLE SEQUENCER & VALID REPLY DETECTOR

RANGEGATE CHANGE OF POSITION DETECTOR & GROUND SPEED VOLTAGE GENERATOR

MULTIPLE RANGING DME

Matter enclosed in heavy brackets [ ] appears in the original patent but forms no part of this reissue specification; matter printed in italics indicates the additions made by reissue.

The present invention relates to a method and system for obtaining and displaying distance information to multiple DME ground stations using a single airborne transmitter-receiver and for displaying groundspeed to one of the stations.

Presently, most air navigation equipment utilizes VOR and VOR/DME equipment. The VOR (Variable Omni-Ranging) is utilized to determine the bearing of the aircraft with respect to a selected ground station and the DME (Distance Measuring Equipment) is utilized to determine the distance of the aircraft from the station. The bearing and distance define the location or position of the aircraft with respect to the ground stations and the groundspeed of the aircraft may also be derived with the DME equipment.

DME equipment is inherently more reliable and more accurate than VOR equipment. Thus VOR is susceptible to scalloping and other types of interference and does not generally provide as accurate a measurement as does DME. It would thus be desirable to provide a second DME on the aircraft to supplement or replace the VOR. Two separate DME's would provide the pilot with distance measurements of the aircraft with respect to two selected ground stations from which the aircraft could accurately be determined to be at one of two specific positions. If it is desired to electronically resolve the position ambiguity, a third DME could be added.

While adding second or third DME's would be advantageous, it is believed that this has not been done in the prior art because the cost thereof would be prohibitive. According to the present invention, by adding a multiplexer and an additional display-memory to a DME system, a single DME is utilized to provide the same effect as two separate DME's, thus substantially reducing the cost. This is accomplished by time multiplexing the single DME between two frequency channels and displays, the distance value being held in the display corresponding to each channel until that channel and the display corresponding thereto is updated, or in some embodiments until a predetermined period of time has elapsed. The multiplexing arrangement is made possible by the faster data acquisition speeds of digital DME's.

Additionally, the present invention provides a method and system for multiplexing the type of DME which provides a distance data output in both search and track modes. According to this aspect of the invention, in a dual channel system one of the channels is designated as the primary channel and the other as the secondary channel and the DME is permitted to go into track in the primary channel before being switched to the secondary channel wherein the system is operated only in search. The appropriate information is stored and the system can be returned to the primary channel in the track mode. Hence according to this aspect of the invention the superior accuracy and signal to noise ratio of the track mode is taken advantage of on the primary channel while still affording the pilot a distance readout to a second station on the secondary channel. In this embodiment the groundspeed is derived from the primary channel distance information.

It is thus an object of the invention to provide a method and system for providing a display of DME distance to two different ground stations utilizing a single DME transmitter-receiver It is a further object of the invention to multiplex a DME receiver which provides distance data outputs in both search and track modes between primary and secondary channels so that the DME distance to primary and secondary ground stations is displayed and so that the receiver can operate in the track mode on the primary channel.

The invention will be better understood by referring to the following drawings in which.

Figure 5:
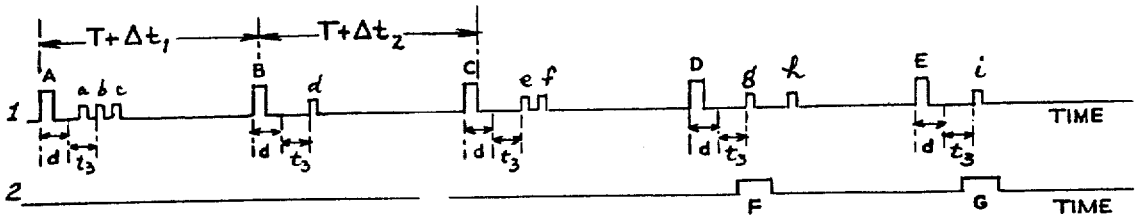
Figure 6:
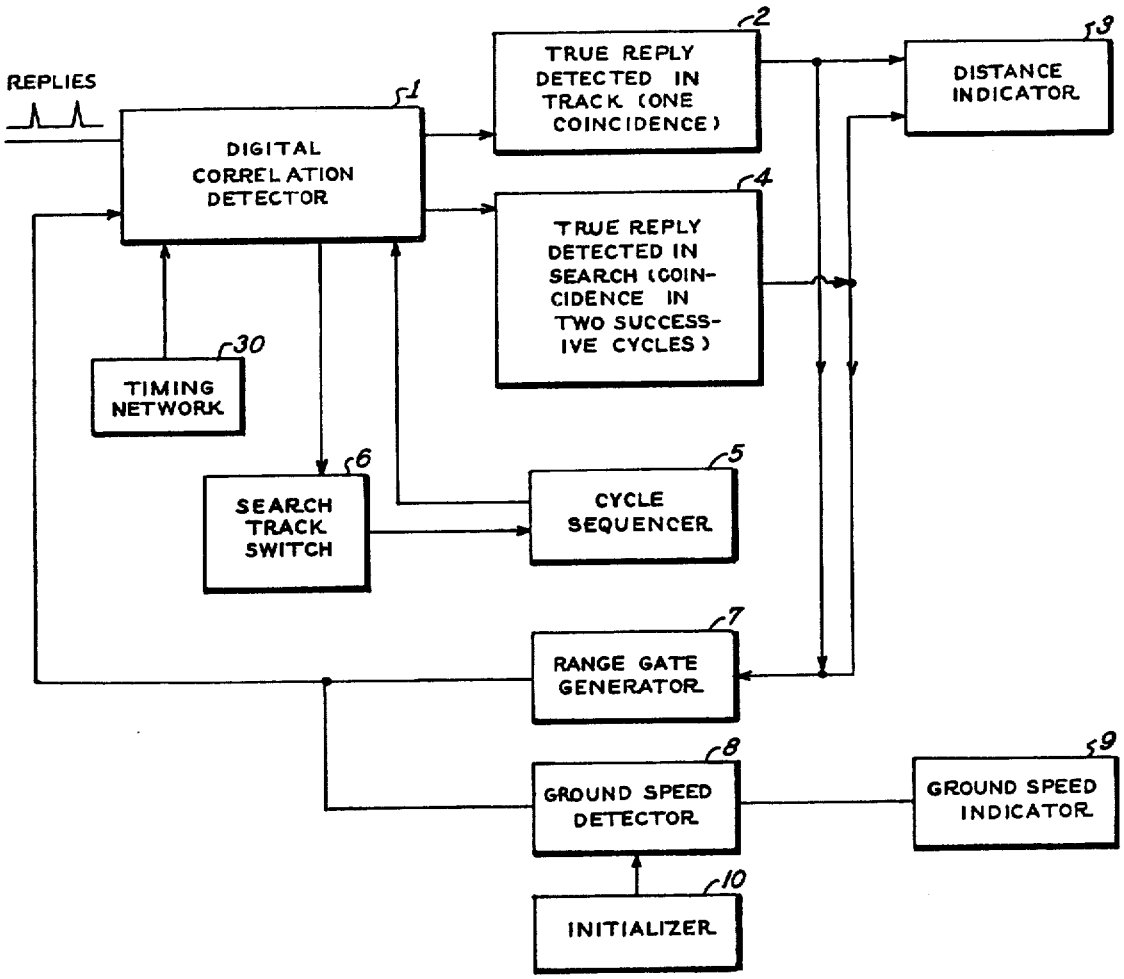
Figure 7:
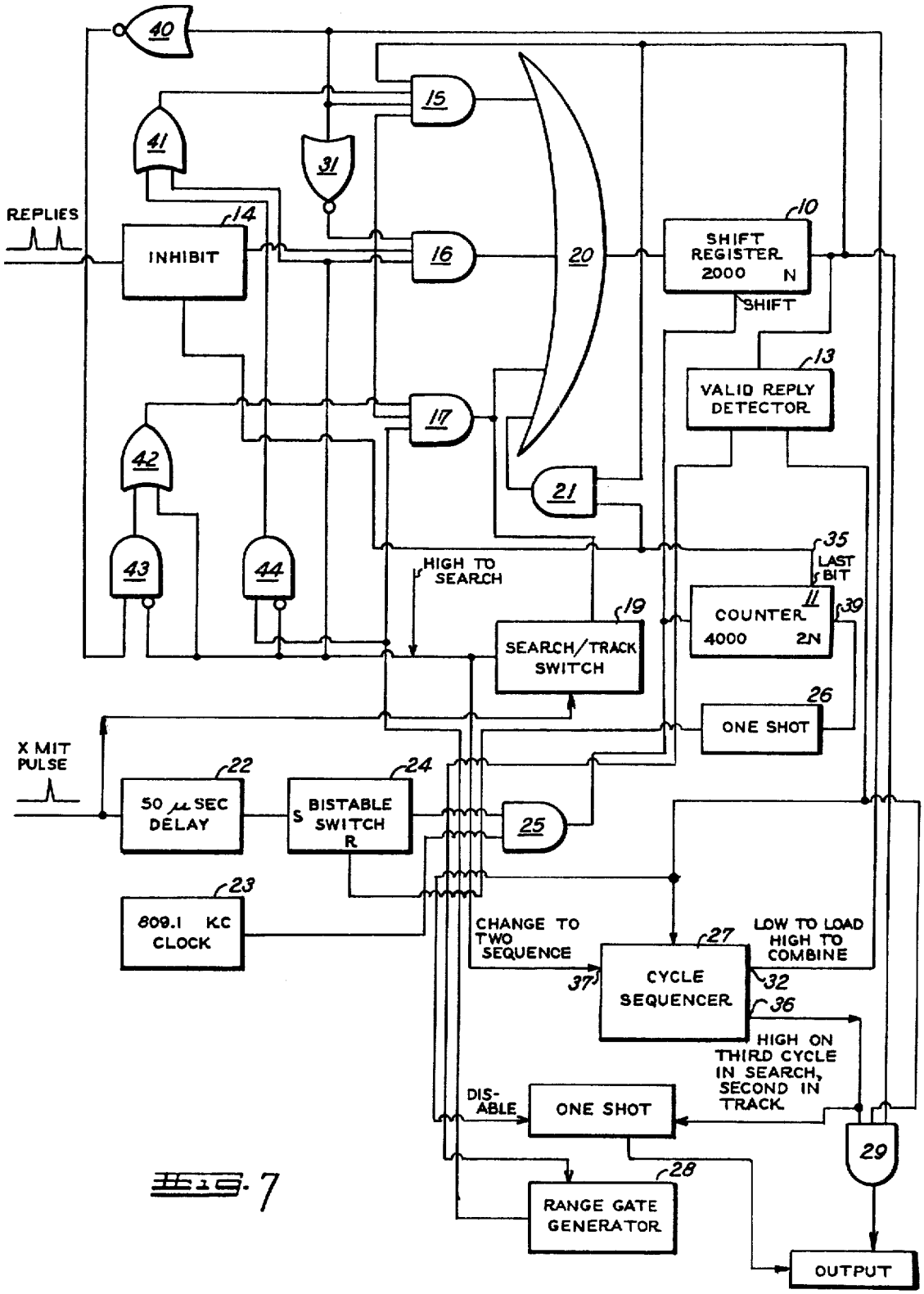
Figure 8:
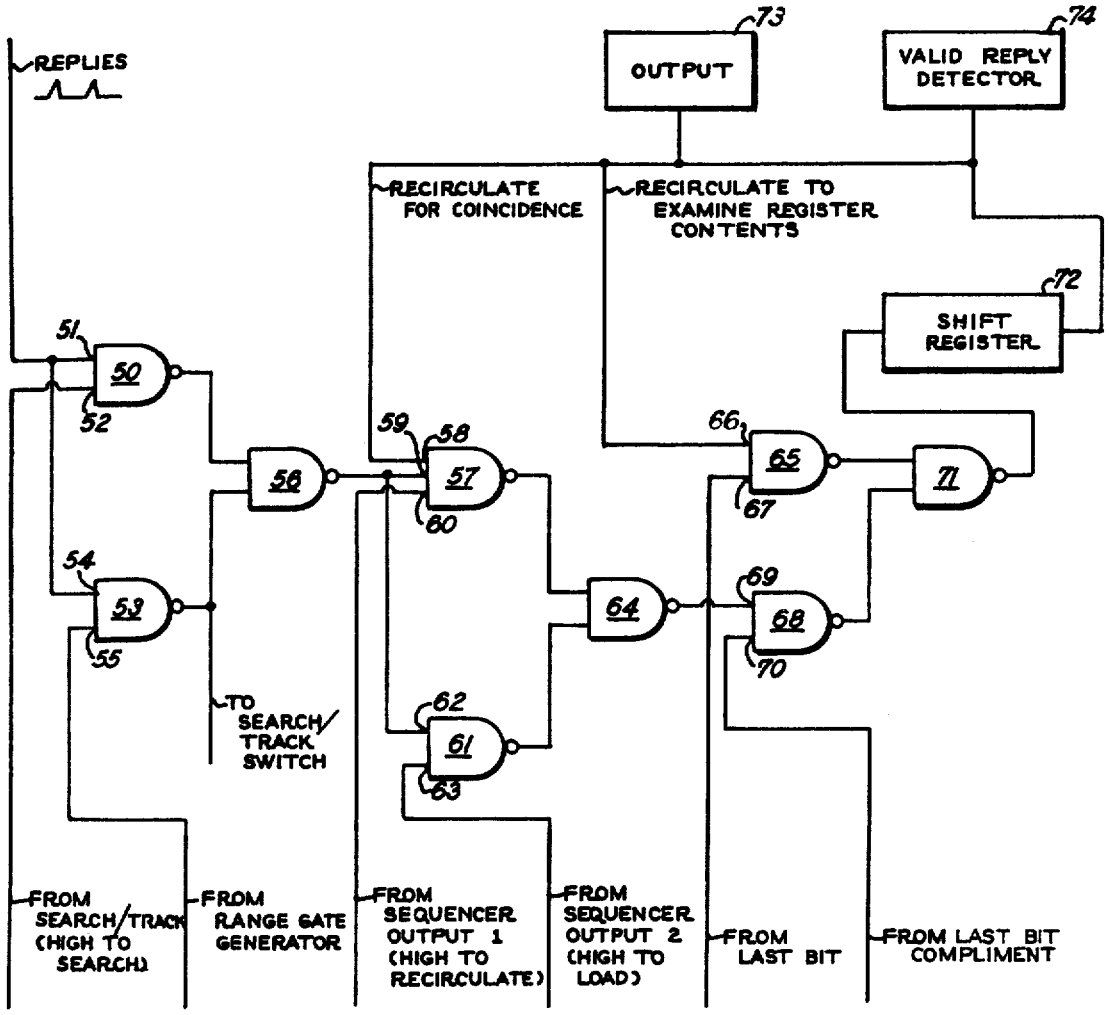
Figure 11:
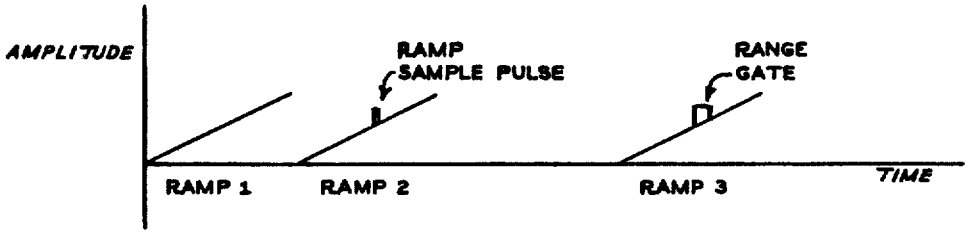
Figure 9:
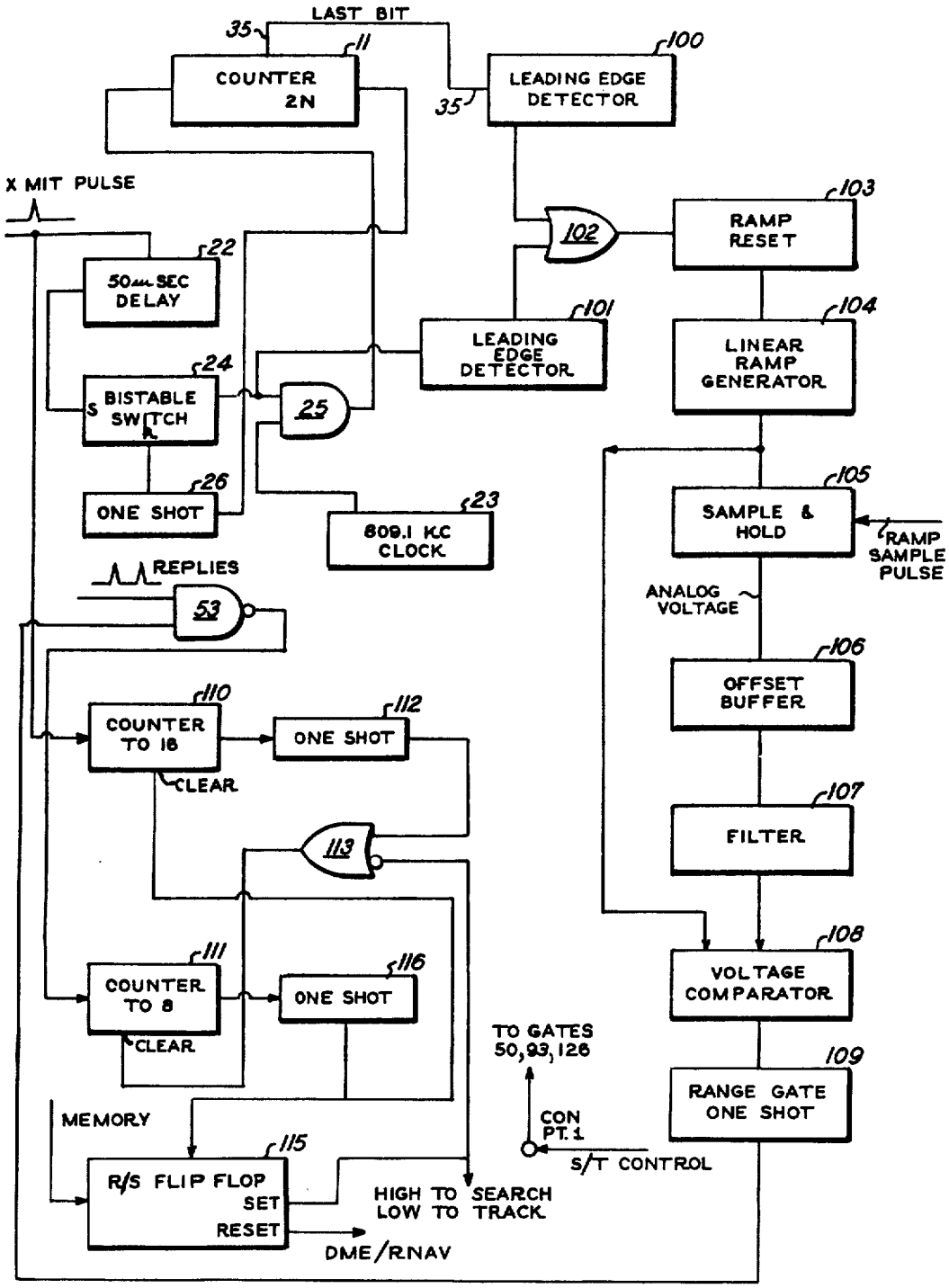
Figure 10:
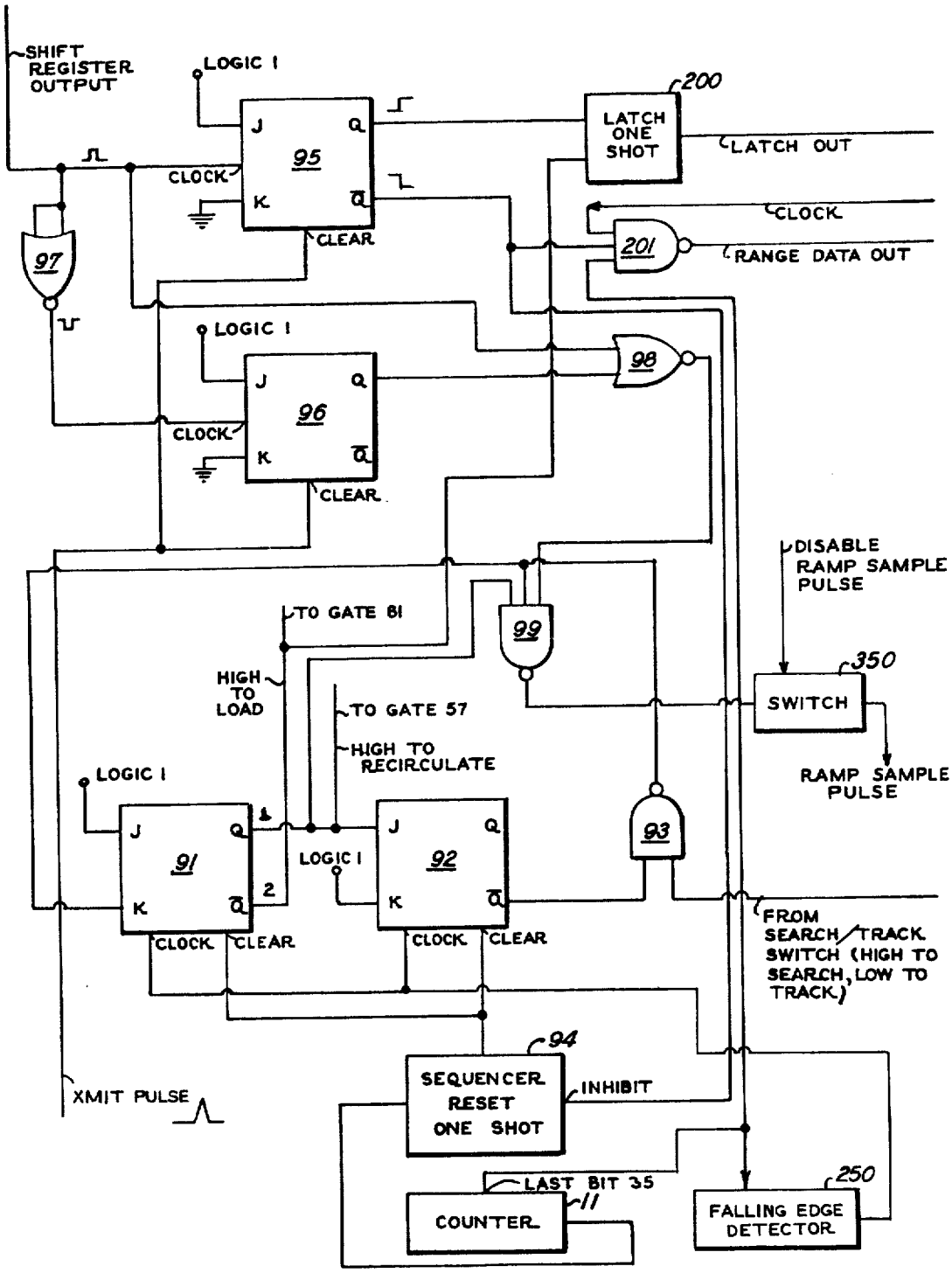
Figure 12:
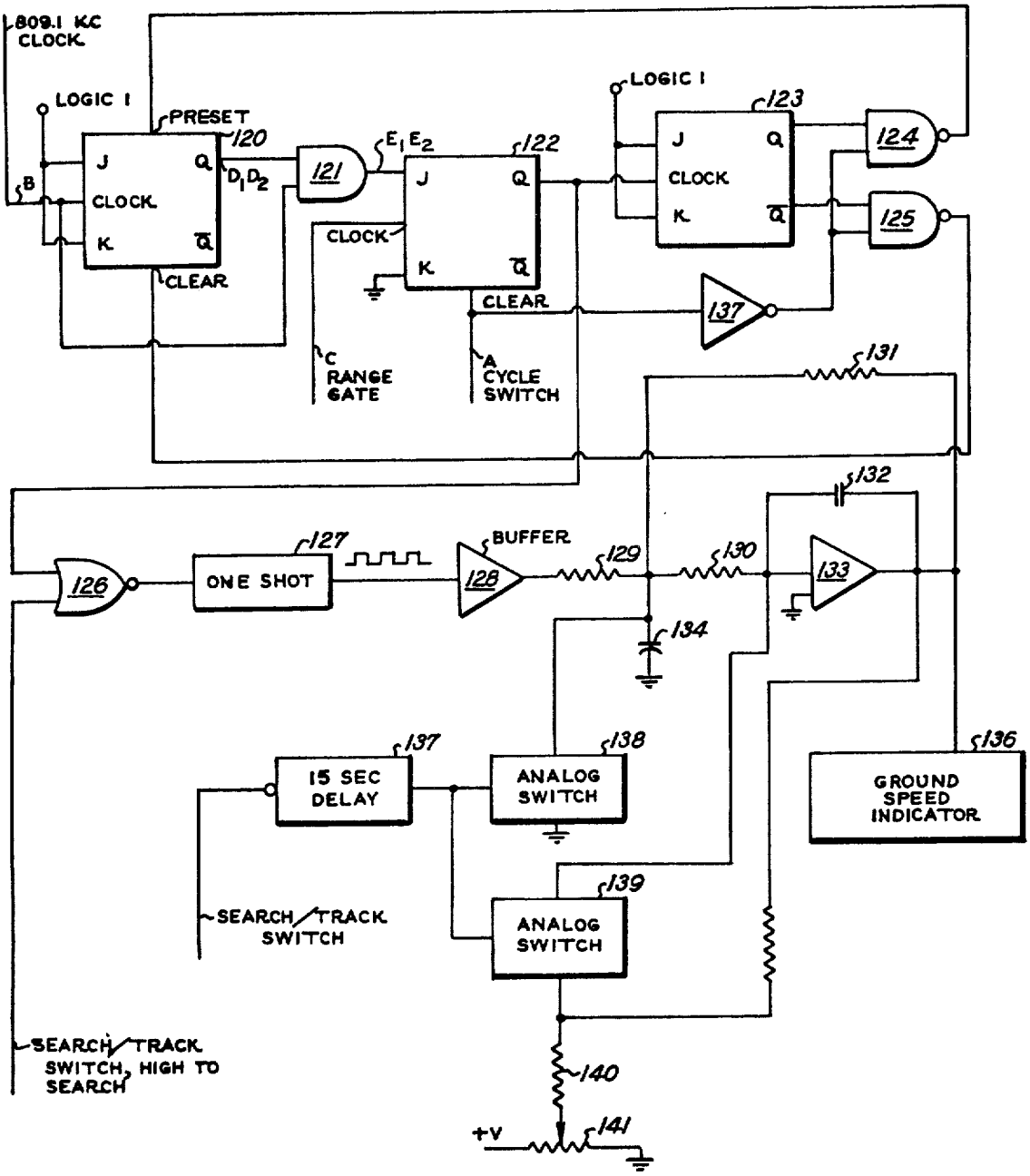
Figure 13:
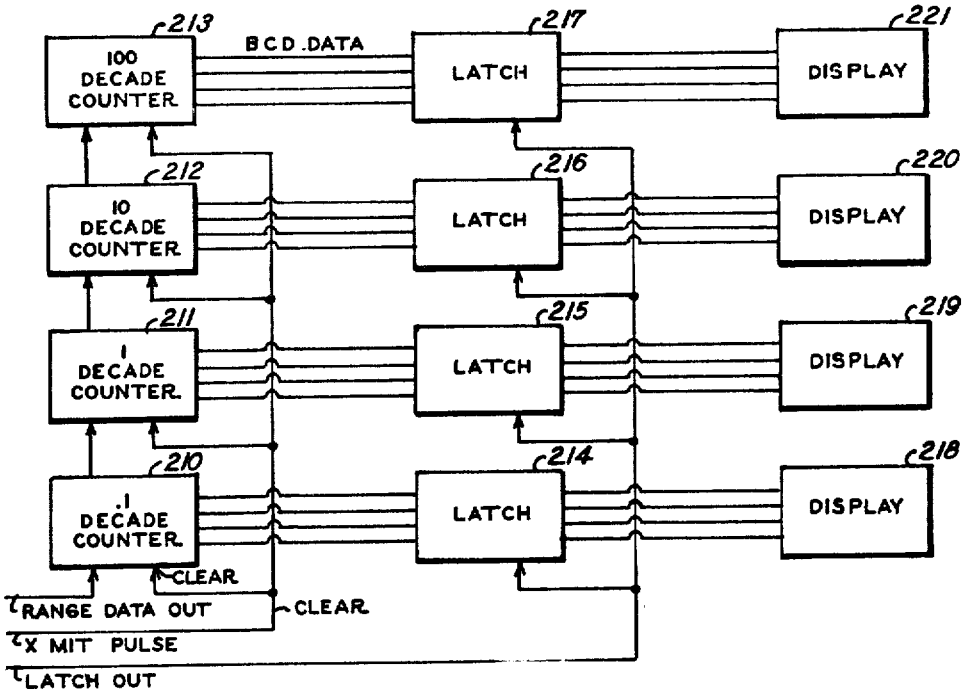
Figure 14:
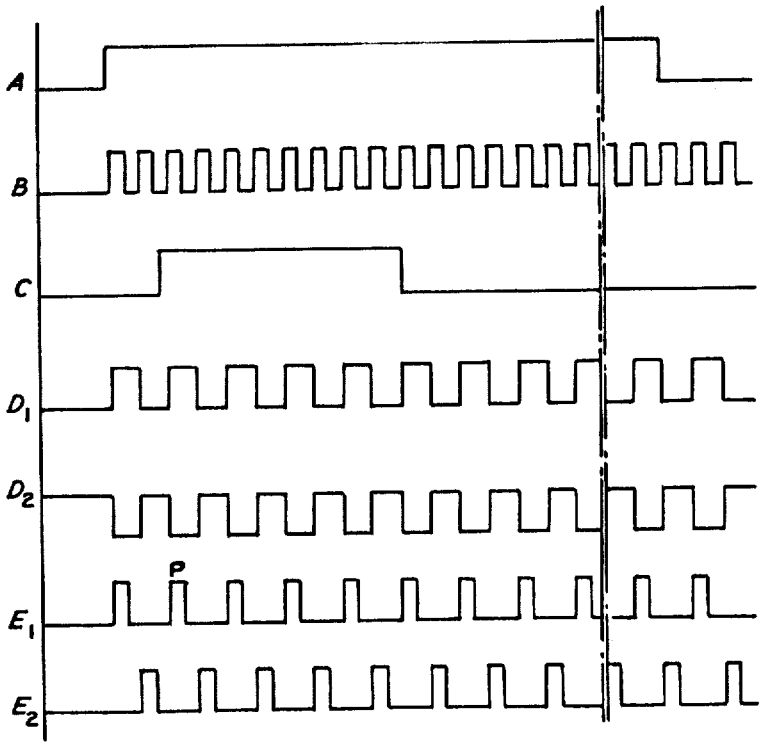

FIGS. 5 to 14 are diagrams of a DME disclosed in copending U.S. Pat. application Ser. No. 609,647 filed Sept. 2, 1975 assigned to the same assignee as the present application and showing a DME providing distance data outputs in both the search and track modes which may be utilized with the multiple ranging DME system shown in FIGS. 3 and 4 and in which:

FIG. 5 is a waveform diagram showing transmitted pulses, reply pulses and the range gate;

FIG. 6 is a functional diagram of the DME;

FIG. 7 is a block diagram of the DME;

FIG. 8 is a schematic diagram of the gate network input to the shift register of the DME;

FIG. 9 is a block diagram of the range gate generator and search/track switch of the DME;

FIG. 10 is a block diagram of the cycle sequencer and valid reply detector of the DME;

FIG. 11 is a waveform diagram showing the ramps generated by the system of FIG. 9;

FIG. 12 is a block diagram of the range gate change of position detector and the groundspeed voltage generator utilized for providing an indication of groundspeed;

FIG. 13 is a block diagram of the output and display network of the DME; and FIG. 14 is a waveform diagram of waveforms produced in the operation of the system of FIG. 12.

Figure 1:
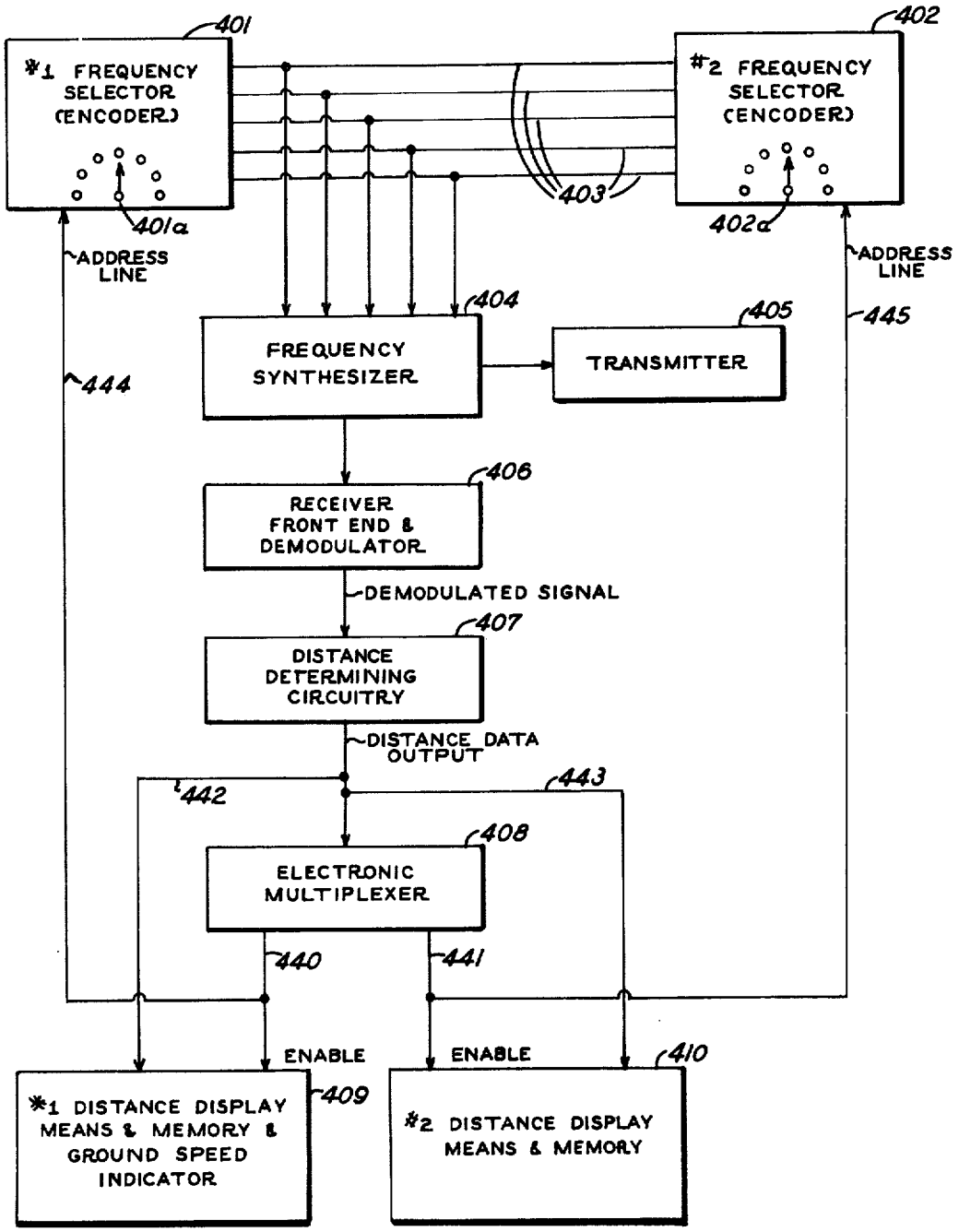
FIG. 1 is a block diagram of a multiple ranging DME system according to the invention.

Referring to FIG. 1, transmitter 405 and receiver 406, 407 are the transmitter and receiver parts respectively of a DME transmitter-receiver, which may be conventional. In FIG. 1 the receiver is indicated as being comprised of front end and demodulator 406 and distance determining circuitry 407. DME transmitter-receivers are known and have been utilized on aircraft for providing distance measurements to ground stations.

As known to those in the art, according to the DME scheme, each ground station is allotted a predetermined frequency channel. When the pilot desires to interrogate a particular ground station he tunes the transmitter-receiver to the frequency of that station and begins transmission. The information transmitted on the alloted frequency is a pulse train and when each pulse of the train is received at the station, after a predetermined delay, the station emits a reply pulse, which is received at the receiver. The time delay between the transmitted pulse and the received pulse, after system delay is subtracted, is proportional to the distance between the aircraft and the ground station.

Referring to FIG. 1, the carrier is received at the receiver front end of the receiver with the information reply pulses impressed thereon and these must be demodulated before the time between the transmitted and reply pulses can be measured. This demodulation is accomplished in block 406 of FIG. 1 and the demodulated pulse reply signals are fed to distance determining circuitry 407. Distance determining circuitry 407 measures the time delay between the transmitted and reply pulses, subtracts the system delay, accounts for the proportionally constant between time and distance, and outputs a signal indicative of the distance between the aircraft and the ground station.

A single DME ordinarily has a single frequency selector associated therewith. The pilot would typically move a stepping switch to a dial position associated with the channel of the selected ground station and this would encode the desired frequency into the system. Since a single ground station is used for both VOR and DME, the pilot may sometimes set the VOR frequency and since there is a unique DME frequency associated with the VOR frequency for each ground station, provision may be made for automatically setting the corresponding DME frequency.

According to the present invention, two channel selectors, a No. 1 channel selector 401 and a No. 2 channel selector 402 are provided. The channel selectors are conventional DME equipment and as known to those skilled in the art are merely encoders which, when addressed, generate signals on a particular coded combination of output lines. While in FIG. 1, selectors 401 and 402 are shown having five output lines, any number of output lines can be utilized. Switches 401a and 402a may be stepping switches and are mounted to traverse a dial having markings corresponding to the frequency range covered by the transmitter-receiver. For each dial position of the stepping switch a different coded combination of output line is enabled. In FIG. 1 the channel selectors are arranged so that the codes enabled by switches 401a and 402a do not appear on the output lines 403 as signals until the selector is addressed. Thus when selector 401 is addressed on line 444, the code set by switch 401a appears on lines 403 and when selector 402 is addressed on line 445 the code set by switch 402a appears on lines 403.

Output lines 403 are fed to frequency synthesizer 404 which is conventional and which includes a means for decoding the code inputted thereto and a means for generating a unique frequency output corresponding to each code. Such synthesizers, as known to those skilled in the art, may be of the phase-lock loop type. The generated frequency is then fed to the DME transmitter and receiver for transmission to and receipt from the ground station.

In the operation of the system, the pilot sets stepping switch 401a to a channel corresponding to a first selected ground station and stepping switch 402a to a channel corresponding to a second selected ground station. Electronic multiplexer 408 is then effective to time multiplex the transmitter and receiver front end between the frequencies corresponding to the two ground stations and to provide corresponding displays of the detected distance on displays 1 and 2 (409 and 410).

Distance display means 1 and 2 may be conventional display means having memory means associated therewith for holding the displayed values for a predetermined period of time. In FIG. 1, when the system begins operations, multiplexer 408 provides an enable signal to display means No. 1 and simultaneously addresses frequency selector No. 1 on address line 444. The DME thus transmits and receives on frequency channel No. 1 and since display means No. 1 is enabled, the distance data output signal on line 442 causes display means No. 1 to display the detected distance. The first distance data output signal also causes multiplexer 408 to generate a signal on line 441 is effective to simultaneously address frequency selector No. 2 on line 445 and to provide an input signal to the enable input of display means No. 2. This causes the transmitter and receiver of the DME to begin operation on the No. 2 frequency channel and the next distance data output generated is fed on line 443 to be displayed on distance display means No. 2, since it is enabled. This next distance data output also causes multiplexer 408 to emit a signal on line 440 which returns the system to the No. 1 frequency channel which enables the No. 1 distance display means for the display of the next detected distance output.

Figure 2:
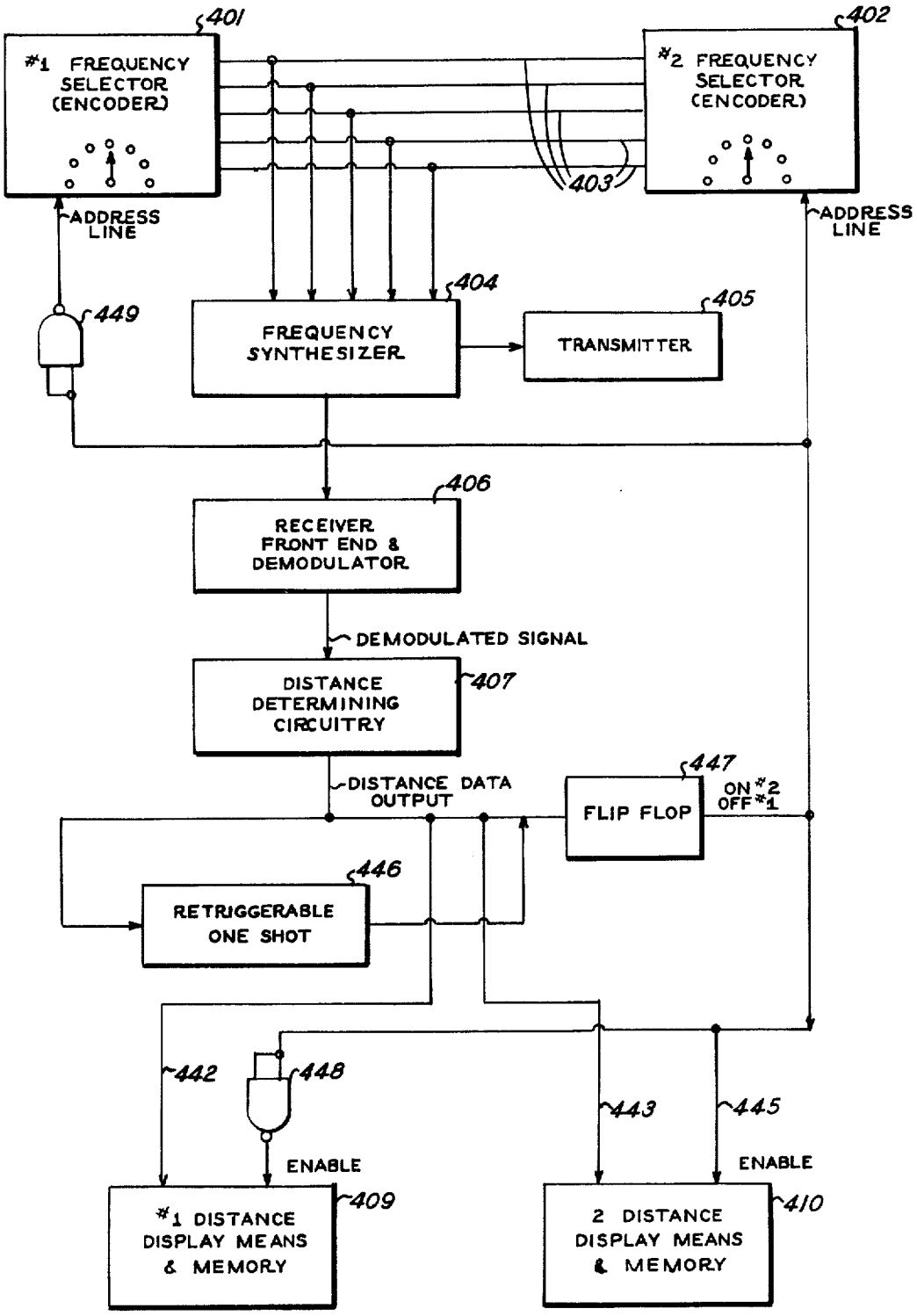
FIG. 2 is a diagram of the multiple ranging DME system of FIG. 1 which includes a schematic diagram of the electronic multiplexer.

In FIG. 2, electronic multiplexer 408 is shown in greater detail. Multiplexer 408 comprises flip-flop 447, retriggerable one-shot multivibrator 446, and NAND gates 448 and 449. When operation begins, flip-flop 447 is in the off state, frequency selector No. 1 is addressed via NAND gate 449 and distance display No. 1 is enabled via NAND gate 448. Thus the DME is operating on channel No. 1 and the first distance data output signal is fed on line 442 to the No. 1 display means for display.

The occurrence of the first distance data output signal causes flip-flop 447 to turn on, thus simultaneously addressing frequency selector No. 2 and enabling the No. 2 distance display means. The DME begins operating on frequency channel No. 2 and the next distance data output signal is fed on line 443 to distance display means No. 2 for display.

The second distance data output signal is also effective to turn flip-flop 47 off, address frequency selector No. 1, and enable the No. 1 distance display means. In some instances it may not be desirable to wait an indefinitely long period of time for the second and subsequent distance data output signals to occur. Thus, for instance, if the distance determining circuitry is having trouble outputting a valid distance data output signal on the second channel, by the time it does so the distance displayed on distance display means No. 1 may no longer be valid. Hence, retriggerable one-shot multivibrator 446 is provided, which is set by the distance data output signal and which is arranged to time out a predetermined period of time after being set. When the one-shot multivibrator times out, it generates an output signal which is inputted to flip-flop 447 to cause the flip-flop to change states, causing the DME to switch channels. Each time the retriggerable one-shot multivibrator 446 receives a distance data output pulse, it is reset and so if it keeps on receiving these signals before the predetermined time duration has elapsed, it will never time out to cause the system to change channels without distance data having been outputted to one of the display means. As is apparent the memories associated with the distance displays should be capable of storing the distance signals at least as long as the period of multivibrator 446.

According to a further aspect of the invention, a system is provided for multiplexing a DME which provides outputs in both search and track modes. Such a DME is shown in block diagram form in FIG. 3 and a specific example of this type of DME is disclosed in co-pending U.S. Pat. application Ser. No. 609,647. In general, the distance data output signals provided in the track mode are more accurate and reliable than those provided in the search mode. According to the invention the DME is time multiplexed between two channels, denoted as the primary and secondary channels, and is arranged so that it can go into and remain in track on the primary channel notwithstanding the multiplexing. The advantages of the track mode are thus attained on the primary channel while still providing a secondary distance display to a different ground station. In this embodiment the groundspeed is derived from the primary channel.

Figure 3:
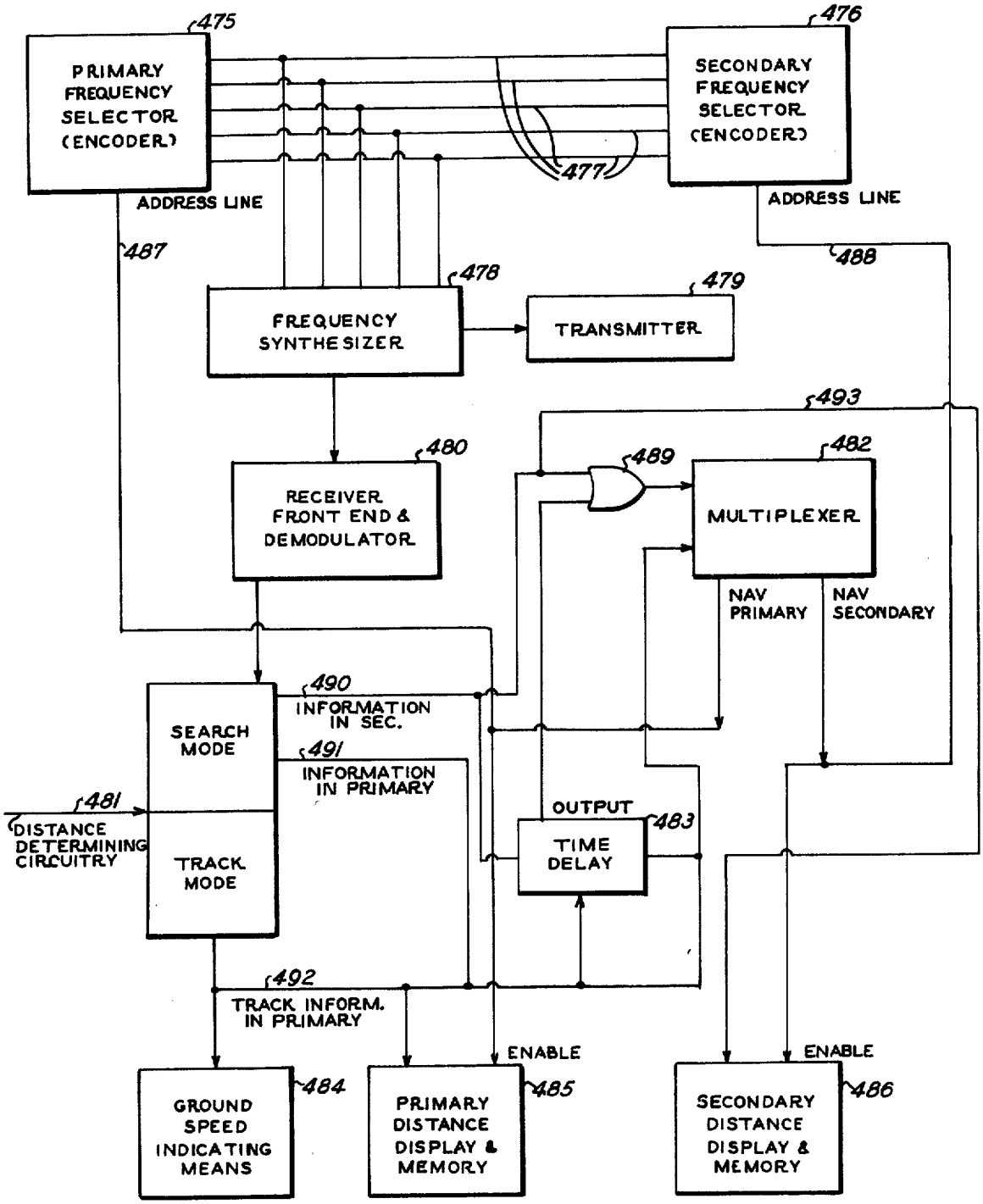
FIG. 3 is a block diagram of a further embodiment of a multiple ranging DME system according to the invention utilized with a DME having distance data outputs in both search and track modes.

Referring to FIG. 3, distance determining circuitry 481 is functionally broken down into search mode and track mode parts. Distance information outputted during the search mode while on the secondary channel is outputted on line 490, and while on the primary channel on line 491. Track information, which is outputted only while on the primary channel is outputted on line 492. This track mode distance information along with timing information is fed to groundspeed indicating means 484 which derives and indicates the groundspeed therefrom.

To begin operation, multiplexer 482 addresses primary channel selector 475 and enables primary display means 485. The first distance data outputted is in the search mode since the DME is in search before going into track, and this data is fed on line 491 to primary distance display means 485 where the distance is displayed. Next the DME goes into track, still on the primary channel, and distance information in this mode is outputted on line 492 which feeds it to primary distance display means 485 for display. Line 492 also feeds the data to groundspeed indicating means 484 for the computation of ground speed. Also line 492 feeds the signal to multiplexer 482 which in response thereto causes a signal to be outputted on the NAV SEC line. This switches the system to secondary channel operation by causing address line 488 to be addressed and the enable input of the secondary display means to be enabled. On the secondary channel the DME is allowed to operate only in the search mode, and the next distance information signal is outputted on line 490 is fed to the secondary distance display means on line 493 for display. This signal is also fed through OR gate 489 to multiplexer 482 and causes the multiplexer to readdress the primary channel and to enable the primary display means by outputting a signal on the NAV PRIM output.

Since it is desired that the DME not lose information stored in the track mode which will permit the DME to return to the track mode when the primary channel is re-interrogated, means are provided to ensure that the system returns to the primary channel if distance information is not outputted in the secondary channel within a predetermined period of time after switching thereto. For this purpose, time delay means 483, which may be a re-triggerable multivibrator, is provided, and this means is set when the distance information in track which switches the DME to the secondary channel is outputted. Means 483 is reset by the occurrence of a distance information output signal on the secondary channel. However, if no such signal occurs before the predetermined period of time has elapsed, means 483 outputs a signal which is fed through OR gate 489 to multiplexer 482 which is effective to cause the multiplexer to return the system to the primary channel.

Figure 4:
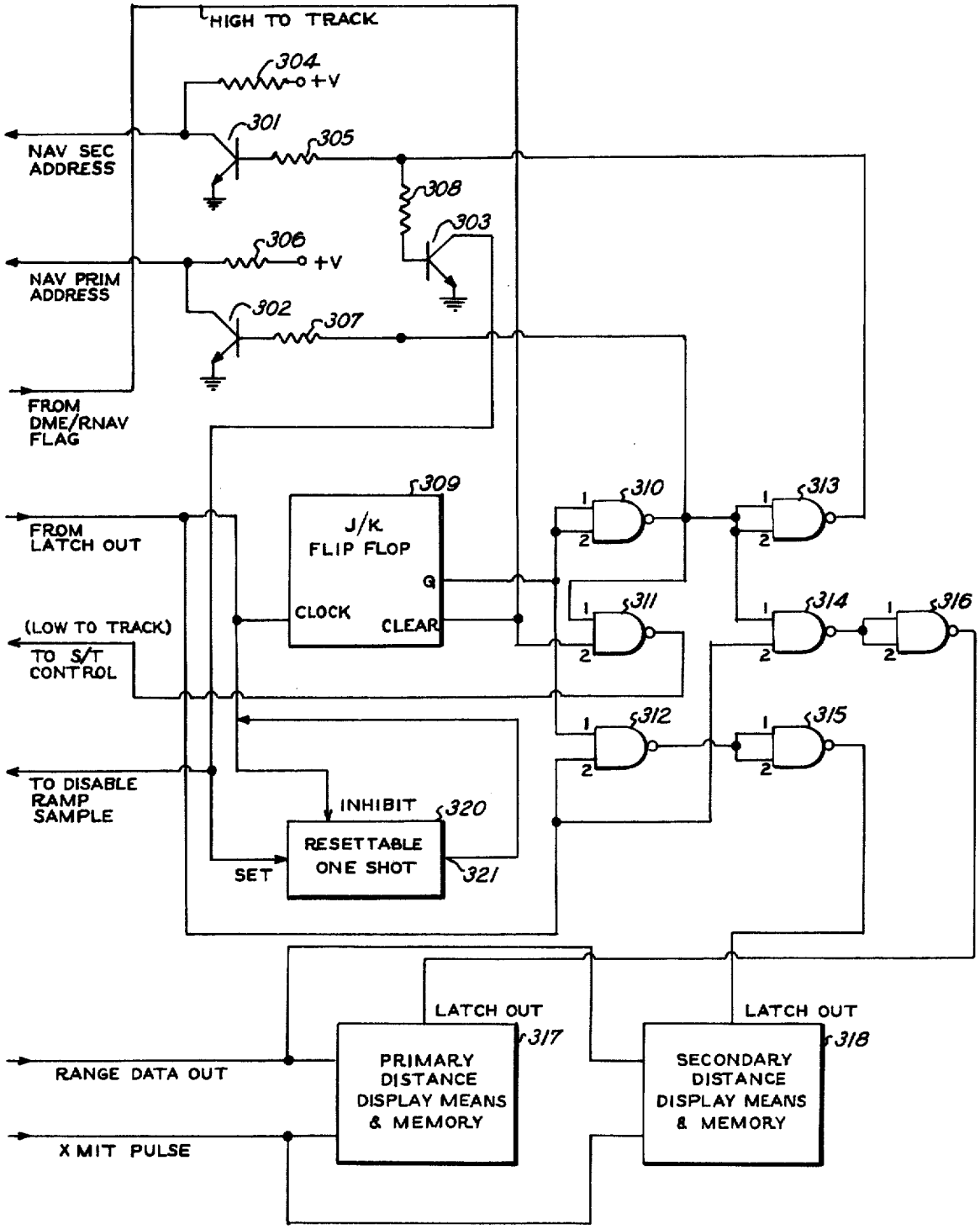
FIG. 4 is a circuit diagram which includes the schematic circuit of the multiplexer of FIG. 3.

While it is to be understood that the system shown in FIG. 3 can be used with any DME outputting distance data in search and track, a specific multiplexer circuit for the specific DME disclosed in co-pending U.S. Pat. application Ser. No. 609,647 is shown in FIG. 4. The DME itself is shown in FIGS. 5 to 14 which are identical with minor modification for adaption to the multiplexer with the Figures of the above-mentioned patent application. The DME in conjunction with FIGS. 5 to 14 will be described before the operation of the multiplexer of FIG. 4 is discussed.

Referring to FIG. 5, pulses A, B, C, D and E represent the transmitted or interrogation pulses which are transmitted to the DME station by the DME transmitter. The transmitted pulse train is randomly jittered about a nominal transmission frequency and a typical nominal period between adjacent transmitted pulses is 1/30 second. The jittering is accomplished by modulator means known to those skilled in the art, such as a random noise generator. Thus in FIG. 5, line 1, the transmitted pulse train has a nominal period T but because of the jittering the actual time interval between the transmission of pulses A and B is $T+\Delta_1$ and the time interval between the transmission of pulse B and pulse C is $T+\Delta t_2$.

Referring to the first cycle illustrated in line 1 of FIG. 5, it is seen that three reply pulses, a, b, and c are received. During the second cycle, one reply pulse d is received, during the third cycle two reply pulses, e, and f are received and so on for the remaining cycles shown. In an actual DME system anywhere from zero to four reply pulses are received and processed during a cycle. The object of the DME is to find those reply pulses which are replies to the transmitting aircraft and to develop a distance signal proportional to the time of occurrence of those pulses. This is accomplished by finding those reply pulses which occur at the same time with respect to the transmitted pulse for at least a fixed predetermined number of cycles. After the fixed system delay d, shown in FIG. 5 is subtracted, the time between each transmitted pulse and the appropriately identified reply pulse responsive thereto is proportional to distance according to the relationship 12.36 $\mu s=1$ mile.

As will be explained in greater detail with respect to the subsequent Figures, the time over which the replies are received is divided by a digital clock pulse train into intervals corresponding to a predetermined distance increment which is 0.1 mile in the illustrative embodiment is therefor $1/1.236=809.1$ kc. Thus the distance corresponding to each reply is ascertained to the nearest 0.1 mile.

Although not pertinent to the contribution of the present invention it should be understood that in an actual DME system each transmitted pulse shown in FIG. 1 is actually a pulse pair having a predetermined spacing between the pulses of the pair. Likewise the reply pulses emitted at the DME station are a pulse pair having a predetermined spacing between the pulses of the pair, and to detect only DME reply pulses in the presence of other signals in the atmosphere which may have various origins but which are known collectively in the art as "fruit", the decoder of the receiver allows only pulse pairs having the predetermined spacing through for further processing. Hence the received signals shown in FIG. 1 as single reply pulses have all been allowed through the pair detector of the decoder and are therefore signals which have been originated at the ground station. In the remainder of the present specification and in the claims, no further reference is made to transmitted or reply pulse pairs but it is to be understood the terms "transmitted pulse", "reply pulse", "replies", "received signals", and their synonyms are to be construed as meaning pairs of pulses and signals as well as individual pulses and signals. Further, although not specifically stated it is to be understood that the terms "time of occurrence", "times of occurrence", "time of receipt" and "times of receipt" of the "reply pulses " or "received signals" are to be construed as meaning the times of occurrence or receipt with respect to the preceding interrogation or transmitted pulse.

FIG. 6 is a simplified functional diagram which broadly illustrates the operation of the DME in both the search and track modes. In the search mode after appropriate decoding and shaping, the reply pulses are inputted to digital correlation detector 1, the structure of which is shown in greater detail in the subsequent Figures. Thus referring to FIG. 5, during the first cycle pulses a, b and c would be loaded into and stored in the correlation detector. During the second cycle pulse d is loaded and the correlation detector determines whether the time of occurrence of pulse 2 is coincident with the time of occurrence of any of pulses a, b or c. If such a coincidence is found to exist then the time of occurrence of the coincident replies is stored and the replies occurring during the third cycle are loaded into the detector to determine if any of them are coincident with the stored time of occurrence. If a coincidence is again detected, then a true reply is deemed to have occurred as indicated by functional block 4 in FIG. 6. Such a true reply is illustrated in FIG. 5 as occurring at time $t_2$. If a coincidence is not detected in either the second or third cycles, then there is no true reply signal output at block 4 and the system begins with a first cycle again.

If a true reply is detected, then a signal is inputted to range gate generator 7 which generates a gate which is centered over the time of occurrence of the two successive coincidences and which has a duration which is a small fraction of a cycle but wide enough to encompass replies at several adjacent time slots. In the illustrative embodiment, for a maximum range capability of 200 miles each cycle is divided into intervals of 1.236 $\mu$s, and the range gate utilized is 18 $\mu$s, in width. Thus the range gate should in general be narrow enough so that it will not pass most of the replies to other aircraft, squitter and echo signals which occur during a cycle but the specific duration thereof may be experimented with and modified. A range gate is shown illustratively, but not to the scale of the illustrative embodiment at F and G on line 2 of FIG. 5 during the fourth and fifth cycles. As will be discussed below, because of possible circuit limitations it is possible that the range gate may not be properly generated as early as the fourth cycle but may begin during a later cycle.

The range gate is inputted to digital correlation detector 1 and as will be explained more clearly below is combined with the incoming reply pulses in a coincidence detector. The output of the coincidence detector is inputted to search/track switch 6 which determines whether or not at least a predetermined percentage of the incoming replies fall within the range gate. If this is the case, then search/track switch 6 switches the system into the track mode wherein all of the incoming replies must be ANDed with the range gate before further processing to determine coincidence with replies from other cycles. Thus many of the replies to other aircraft and squitter which would be inputted for storage and coincidence determination in search do not get through in track because they fall outside the range gate. This means that the signal to noise ratio is increased and this allows the correlation detector to operate on a 2-cycle instead of a 3-cycle sequence in track. Thus in track, as indicated by functional block 2 in FIG. 6, a load cycle followed by a coincidence in the following cycle is sufficient for a true reply to be detected. Use of a 2-cycle instead of a 3-cycle sequence permits faster acquisition of data and allows the system to respond to DME stations having low reply rates as the number of times that two coincidences in a row will be received is substantially higher than the number of times that three coincidences in a row will be received.

It is significant to note that while a preferred embodiment operates with a 3-cycle sequence in search the system only requires that common times of receipt of reply signals be present for a predetermined number of successive cycles and the predetermined number may be any number greater than one. Additionally, while in the illustrated embodiment the system switches to a 2-cycle sequence in tract it is only required that the predetermined number utilized in search be reduced when the system switches into track.

All true replies are inputted to distance indicator 3 which converts their time of occurrence to a distance figure and displays this figure as well as being inputted to the range gate generator to update the position of the range gate. Additionally, the rate at which the position of the range gate changes is tracked by groundspeed detector 8 which may include initializer 10 and which detector inputs a signal to groundspeed indicator 9 which indicates the groundspeed of the aircraft.

FIG. 7 is a block diagram of the system shown in functional form FIG. 6 and more clearly illustrates the fundamentals of the digital correlation detector. The operation of timing network 30 of FIG. 6, which is comprised of blocks 22 to 26 and 11 in FIG. 7, will be described first. The timing network is operative to delineate a time following each transmitted pulse over which replies are admitted to the correlation detector (which time corresponds to the maximum distance to be measured) and to divide the time up into the number of unit time intervals discussed above.

The delay d shown in FIG. 5 is caused mainly by the delay between the receipt of a transmitted pulse and the transmission of a reply pulse at the ground station and to a lesser extent by receiver processing delays. This delay is about 50 $\mu$secs. and is provided in the system of FIG. 7 by delay network 22. The occurrence of the transmitted pulse triggers 50 $\mu$secs. delay network 22 which feeds the delay signal to the set input of set/reset bistable switch 24. This causes the output of the switch to go high and the output is connected to the input of AND gate 25 as is the output of clock 23. As indicated above, since in the illustrative embodiment it is desired to divide the cycle into time intervals corresponding to 0.1 mile the clock frequency is 809.1 kc.

The setting of switch 24 thus causes the clock signal to be gated through AND gate 25 to the input of counter 11 which counts a predetermined number of clock pulses before outputting a signal on output line 39 and resetting itself to zero. The counter output signal is fed to a one-shot multivibrator 26 which immediately generates a pulse which is fed to the reset input of bistable switch 24, thus resetting the switch and causing its output to go low. Thus, one input to AND gate 25 goes low and further clock pulses are inhibited from passing therethrough, thus signifying the end of the timing interval.

The clock pulses outputted from AND gate 25 during the timing interval are fed to the shift input of shift register 10. The detected reply pulses are inputted to the information input of the shift register and, as will be explained in greater detail below, the clock pulses shift the reply signals through the register. If each clock pulses is indicative of 0.1 mile and it is desired that the total range of the DME be 200 miles, then the shift register 10 will have 2000 storage positions.

The detected reply pulses during a first or load cycle are inputted to the system at INHIBIT gate 14 which for the present we will assume is a closed circuit and thus in its non-inhibiting state. All replies coming into the system may be loaded into shift register 10 through OR gate 20 and one of AND gates 15, 16 and 17. In the load cycle in search replies are fed through AND gate 6, in the recombination cycles in both search and track through AND gate 15 and in the load cycle in track through AND gate 17. As will be described in detail below, the outputs of cycle sequencer 27 and search/-track control signals determine the flow path of the replies.

Cycle sequencer 27, one embodiment of which is shown in greater detail in FIG. 10, is a circuit which knows whether the digital correlation detector is in the first (load), second or third cycles and provides information indicative of this at its outputs. In FIG. 7 output 32 of the sequencer is low during the load cycle which low signal is inverted by inverter 31 and inputted as a high signal to AND gate 16. Also inputted to AND gate 16 is either the output of search/track switch 19 or the search/track control output of the multiplexer (shown in FIG. 9) depending on whether or not the DME is being multiplexed. This input to AND gate 16 is high in the search state and low in the track state. Thus in the load cycle the reply signals are gated through AND gate 16 and from there through OR gate 20 to the information input of shift register 10. The signals are shifted through shift register 10 by the clock pulses from AND gate 25 and thus at the end of N clock pulses, shift register 10 is fully loaded. If any reply signals occurred during the time interval, then they are present in shift register 10 at a storage position displaced from the right end of the register in FIG. 7 by a number of storage positions which is proportional to the DME distance corresponding to the replies.

Each cycle is divided in half by counter 11. If counter 11 is a binary counter and has enough bits to count to 2 N, at the time that the last bit first becomes operative the counter will have counted to N. Thus in FIG. 7 counter 11 is arranged so that line 35 goes high when it has counted to N and remains high until the counter counts to 2 N at which time line 39 goes high. Since shift register 10 has N storage positions, beginning at count N+1 and ending with count 2 N the data in the register is shifted out and examined by valid reply detector 13, and at the same time recirculated so that the data is not lost. Thus when the line 35 goes high data is recirculated through AND gate 21 and OR gate 20, INHIBIT gate 14 becoming activated at this time to inhibit new data from being inputted to the system. The data clocked out of the shift register is examined by valid reply detector 13 to determine if at least one signal is present. If it is, then valid reply detector 13 causes output 32 of sequencer 27 to go high in the second and third cycles in search and in the second cycle in track. If no signal is present then output 32 remains low and a load cycle is repeated.

Assuming that at least one reply was present during the first cycle replies occurring during the first half of the second cycle are loaded into the register through AND gate 15 if they are coincident with replies which occurred during the first cycle. Thus during the second cycle as replies are fed to gate 15, the contents of shift register 10 are also fed to gate 15. Since output 32 of the sequencer and the search/track signal are high, each time a coincidence between replies in the first and second cycle occurs a pulse is inputted to the register. If there are no coincidences the register is empty at the end of the second cycle and the next cycle is a load cycle. If there is at least one coincidence then a third cycle similar to the second cycle ensues and if there is a coincidence during the third cycle its time of occurrence is fed through gate 29 to the output where it is displayed as DME distance.

Simultaneously the signal indicative of the time of occurrence of the second successive coincidence is fed to range gate 28 which generates the range gate discussed above which is centered over the coincidence time. Generator 28 is arranged so that the gate occurs in successive cycles and it is inputted to AND gate 17 along with the incoming reply signals. Thus the incoming reply signals are gated through AND gate 17 only if they are coincident with the range gate. Such coincidences are fed to search/track switch 19 along with the transmitted pulses and the function of search/track switch 19 is to determine if a predetermined percentage of replies fall within the range gate and in the illustrative embodiment this percentage is 50%. If the percentage condition is met, then the system switches into the track state and the search/track signal goes low. This inhibits reply pulses from being passed through AND gate 16 and forces all replies through AND gates 17 or 15 where they are ANDed with the range gate. Also, the search/track signal is fed to input 37 of cycle sequencer 27 which is effective to change the sequencer to a 2-cycle instead of a 3-cycle sequence.

The search/track switch and cycle sequencer are connected to AND gates 15 and 17, in part through inverter 40, AND gates 43 and 44 and OR gates 41 and 42 so that during the first or load cycle in track incoming replies are ANDed with the range gate in AND gate 17 and during the second or coincidence cycle in track are ANDed with the range gate in AND gate 15. If a coincidence is detected, then the distance information is outputted and displayed through AND gate 29 and the range gate is up-dated.

FIG. 8 is a schematic diagram of a preferred embodiment of the gate network input to the shift register and its operation is substantially functionally equivalent to the operation of the gate network shown in FIG. 7. The gate network of FIG. 8 is comprised of a series of interconnected NAND gates and the incoming reply pulses from the ground station are fed to input 51 of NAND gate 50. In the load cycle of the search mode, input 52 to gate 50, which is connected to the search/track signal, is high and the path that the replies follow while being loaded into the register 72 is through NAND gates 50, 56, 61, 64, 68 and 71. The signals are fed through gate 61 instead of gate 57 because inputs 63 and 60 of those gates respectively are connected to the output of the cycle sequencer, which arranges for input 63 to be high during the load cycle and input 60 to be low. Specifically the inputs are illustrated as coming from the cycle sequencer embodiment shown in FIG. 10.

A cycle is the time beginning with each transmitted pulse and ending a predetermined duration later, before the occurrence of the next transmitted pulse. During the first half of each cycle replies are loaded into the register. The first or load cycle replies are fed through gate 68 instead of gate 65 because input 70 of gate 68 is high for the first half of each cycle while input 67 of gate 65 is low and vice-versa for the second half of each cycle. During the second half of each cycle, the contents of the shift register are recirculated through NAND gate 65 and are examined in the valid reply detector 74.

During the second and third cycles in search and the second cycle in track input 63 to NAND gate 61 is low while input 60 to NAND gate 57 is high and the contents of the shift register are ANDed in gate 57 with the incoming replies which are fed in on input 59, to determine if any coincidence are present.

When the DME is operating in track, input 52 of gate 50 is low and all of the incoming replies are forced through NAND gate 53 where they are ANDed with the range gate. Hence in the track mode all incoming replies are ANDed with the range gate.

FIG. 10 is a diagram of the cycle sequencer and valid reply detector of the system. As described in conjunction with FIG. 8, it is the function of the cycle sequencer to provide a high signal to gate 61 and a low signal to gate 57 in the load cycle and a high input to gate 57 and a low input to gate 61 during the recirculate for coincidence cycles. To accomplish this the contents of the shift register must be examined during the second half of the preceding cycle to determine if any signals are present in the register. If none are present, then the next cycle is again a load cycle while if one or more signals is present, the next cycle is a recirculate for coincidence cycle. Additionally, the cycle sequencer must know whether the system is in search or in track to provide either a three cycle or two cycle output sequence.

Referring to FIG. 10, the cycle sequencer is comprised of bistable devices 91 and 92 and NAND gate 93, which are operated in conjunction with sequencer reset one-short multivibrator 94. The valid reply detector is comprised of bistable devices 95 and 96.

Bistable devices 91 and 92 are arranged so that output 1 of bistable device 91 which is connected to an input of gate 57 is high to recirculate while output 2 which is connected to an input of gate 61 is high to load. The J input of bistable device 91 is connected to a logic 1 source as in the K input of bistable device 92. The Q output of device 92 is connected to an input of NAND gate 93 as is the output of the search/track switch when the DME is not being multiplexed or the search/track control output of the multiplexer when multiplexing is operative. Since both the output of the search/track switch and the search/track output of the multiplexer is high to search and low to track, the output of NAND gate 93 will be either high or low in search depending on the Q output of device 92 but will always be high in track.

If the valid reply detector determines that no signals are in the register, sequencer reset one-shot multivibrator which is activated at the end of each cycle by the end of count output signal of counter 11 clears devices 91 and 92 and with the next transmitted pulse a new load cycle begins. If the valid reply detector determines that a signal is in the register, it feeds a signal to the inhibit input of the sequencer one-shot multivibrator so that the counter output is unable to trigger it, and the bistable devices are not cleared. Sequencer reset one-shot multivibrator 94 is a logic block known to those skilled in the art and may for instance be one half of a Fairchild 8602.

As indicated above, the last count of counter 11 is fed to reset one-shot 94 to clear bistables 91 and 92 if no shift register signals are detected by the valid reply detector. Bistables 91 and 92 are clocked by the output of falling edge detector 250 which detects the falling edge of the last bit of the counter. The clocking of the bistables and incrementing of the sequencer is thus the last operation performed in a cycle. Thus the output of falling edge detector 250 is arranged to occur (by employing a delay means if necessary) before the output of reset one-shot multivibrator 94. Successive cycles cause bistable devices 91 and 92 to assume the states given in the below tables:

| Search Sequence | | | Track Sequence | | |
|---|---|---|---|---|---|
| start load | 1 0 0 0 | | load | 1 0 0 0 | |
| | 0 1 1 1 | | | 1 1 1 1 | start only |
| after 1st clock pulse | 1 1 1 0 | | sample | 1 1 1 0 | |
| | 0 0 1 1 | repeat | | 1 0 1 1 | |
| after 2nd clock pulse | 1 1 1 1 | | | load 1 0 0 1 | |
| | 1 0 1 0 | | | 1 1 1 0 | repeat |
| after 3rd clock pulse | 1 0 0 0 | | sample | 1 1 1 0 | |
| load | 0 1 1 1 | | | 1 0 1 1 | |
| | | | load | 1 0 0 1 | |
| | | | | 1 1 1 0 | |

The operation of the valid reply detector is as follows. During the recirculate to examine portion of each cycle the contents of the shift register are outputted to the clock input of device 95 and the signals illustrated at the Q and $\overline{Q}$ outputs of the device are generated in response to the presence of a shift register signal. Further, the shift register signals are inverted in inverter 97 and applied to the clock input of bistable device 96. The Q output of device 96 is connected to an input of NOR gate 98 and the shift register output is connected to the other input of the gate. The output of NOR gate 98 is a pulse occurring in time correspondence with the shift register signal and becomes the ramp sample pulse if it occurs during the third cycle in search or the second cycle in track. The pulse is fed to NAND gate 99 which also receives inputs from output 1 of bistable device 91 and the output of NAND gate 93. Since these outputs are both high only in the final cycle of a sequence the pulse output of gate 98 is gated through gate 99 only in the final cycle of a sequence. The ramp sample pulse is applied to sample and hold network 105 in FIG. 9 described in detail below. When the multiplexer of FIG. 4 is utilized the ramp sample pulse is fed through switch 350 which can be activated by the multiplexer to disable the ramp sample pulse. As will be described in conjunction with FIG. 4, the ramp sample pulse is disabled when the multiplexer is interrogating the secondary channel.

NAND gate 201 has two of its inputs connected to the last bit line 35 of counter 11 and to the clock pulse line. Hence during the second half of each cycle clock pulses are outputted from the output of gate 201 which is denoted Range Data Out. The third input of gate 201 is connected to the Q output of device 95 which has a negative going step signal thereon at the time of occurrence of a shift register signal. Hence when a shift register signal is read out of the register further clock pulses are inhibited and at the time of occurrence of the shift register signal a number of output pulses proportional to the DME distance thereof have appeared at the Range Data Out output.

Latch one-shot multivibrator 200 has its enable input connected to the Q output of device 95 and its other input connected to output 2 of device 91. Therefore one-shot multivibrator 200 is enabled only at the time that a reply is read out of the register and produces a Latch Out output signal when the sequencer switches from recirculate to load at the end of the cycle, providing that a reply occurring during that cycle has enabled the one-shot. Thus the only time that a Latch Out output signal can occur is at the end of the third cycle in search or the second cycle in track.

FIG. 13 is a diagram of a display network used for displaying DME distance in single channel operation. As will be explained in conjunction with FIG. 4 when the multiplexer of the present invention is being used instead of a single display network such as shown in FIG. 13 each of networks 317 and 318 in FIG. 4 includes a network as shown in FIG. 13. Thus the range data out, xmit pulse and latch out input lines shown in FIG. 13 are inputs to the multiplexer of FIG. 4

The operation of the display network will be explained in conjunction with FIG. 13 but it is to be understood that a similar explanation applies to networks 317 and 318 of FIG. 4. Referring to FIG. 13, the network is comprised of decade counters 210, 211, 212 and 213, latches 214, 215, 216 and 217 and displays 218, 219, 220 and 221. The range data out line shown in FIG. 10 is connected to the input of the decade counter network. As described above, clock pulses are fed out on the range data out line until a stored signal is outputted from the shift register, at which time the counter stops. Hence at the time of occurrence of the shift register signal decade counters 210, 211, 212 and 213 will have counted to a number corresponding to the position of the signal in the shift register. Since the count stops at the first shift register signal only the first stored signal is outputted and displayed. Thus if there are multiple signals stored in the shift register, for instance due to echo signals, the later occurring signals are not fed through to the counters.

The range data out signals are fed out during the second half of each cycle and thus the decade counters are counted up during each cycle. However, as indicated above, it is desired to utilize only those shift register signals which are present during the final cycle of a sequence, that is according to the illustrative embodiment, the third cycle in search or the second cycle in track, and for this reason the latch one-shot multivibrator 200 in FIG. 10 is provided. The latch out line is fed to the inputs of latches 214, 215, 216 and 217 in FIG. 13. As described in conjunction with FIG. 10 a signal is generated on this line only when a shift register signal is fed out of the register and the cycle is a final cycle of the sequence. Hence at such a time latches 214, 215, 216 and 217 are triggered, which causes them to latch signals indicative of the numbers in the counters through to displays 218, 219, 220 and 211. Thus a distance figure corresponding to the first occurring coincidence in the shift register is displayed. Counters 210, 211, 212 and 213 are cleared at the beginning of each cycle by the transmitted pulse or by a one-shot multivibrator output pulse triggered by the transmitted pulse.

FIG. 9 is a block diagram of the range gate generator and search/track switch of the system. Referring to FIG. 10, the ramp sample pulse is generated during the recirculate to examine half of the third cycle in search at a time measured from the beginning of the second half of the third cycle which is proportional to the range of the coincidence. The function of the range gate generator is to generate a range gate at the same time with respect to the beginning of the first half of the next cycle or other subsequent cycle as the time of occurrence of the ramp sample pulse with respect to the beginning of the second half of its cycle.

Since the operation of the range gate generator is dependent upon the timing circuitry of the system, blocks 22, 23, 24, 25, 26, and 11 are repeated in FIG. 9. Additionally, linear ramp generator 104 is provided and it may be any type of conventional ramp generator circuit known to those skilled in the art. It is arranged so that it generates a linear ramp each time it is reset by a signal from ramp reset switch 103. Ramp reset switch 103 is connected through OR gate 103 and leading edge detector 101 to the output of set/reset bistable switch 24 and is also connected through OR gate 102 and leading edge detector 100 to the last bit output 35 of counter 11. Hence ramp reset switch 103 is triggered both at the beginning of each cycle and exactly after half of the cycle has elapsed.

Referring to FIG. 11, it is seen that the output of linear ramp generator 104 during the first cycle is ramp 1 followed by ramp 2, ramp 1 lasting for a total of N counts and ramp 2 also lasting for a total of N counts. During the second ramp which also defines the time interval of the recirculate to examine portion of the cycle, the ramp sample pulse output of NAND gate 99 in FIG. 10 is generated. This ramp sample pulse is fed to the input of sample and hold circuit 105 through switch 350. Circuit 105 may, for instance, be comprised of an analog gate for sampling and a capacitor for holding. Thus the second ramp is sampled at the time of occurrence of the ramp sample pulse and the analog voltage value of the ramp at the time of sampling is fed to offset buffer 106 which, for instance, may be an operational amplifier with an offset.

The output of offset buffer 106 is fed through filter 107 to voltage comparator 108. At the voltage comparator the analog voltage is compared with the first ramp of the next cycle or other subsequent cycle denoted as ramp 3 in FIG. 11 and at the time that ramp 3 rises to the stored voltage, voltage comparator 108 outputs a signal which is effective to trigger range gate one-shot multivibrator 109 which generates the range gate which in the illustrative embodiment of the invention is 18 $\mu s$ wide. If the relative circuit component values including the value of the holding capacitor in sample and hold 105 cannot be arranged so that the capacitor can be charged to the sampled value of the ramp during the occurrence of a single ramp sample pulse then it may be necessary for several ramp sample pulses (several successful sequences) to occur before the capacitor is charged to the sampled value of the ramp. Offset buffer 106 was described above and the purpose of the offset is to lower the sampled voltage slightly so that a lowered voltage is fed to comparator 108 resulting in the generated range gate being centered over the coincidence time rather than beginning at the coincidence time. If the range gate is 18 μs long then an offset corresponding to 9 μs would be used.

At the time of occurrence of the ramp sample pulse changes in subsequent cycles the range gate is up-dated and its position is changed. However the values of the circuit components in the holding circuit in sample and hold network 105 are arranged so that even if no new ramp sample pulses occur over a period of time, for instance, illustratively several seconds, the sampled value is held so that the range gate continues to be generated. Additionally, the sampled analog value is filtered in filter 107 so that the position of the range gate does not respond to rapid changes in the position of the ramp sample pulse and as will be described below the filtered range gate aids in the determination of groundspeed.

The range gate is fed to NAND gate 23 where it is ANDed with the incoming replies and the search/track switch is provided to determine if a mininum predetermined percentage of the replies occur during the range gate. The search/track switch, in FIG. 9 is comprised of counters 110 and 111, one-shot multivibrators 112 and 114, OR gate 113, and reset/set flip-flop 115. Basically the search/track switch operates by simultaneously counting transmitted pulses and reply-range gate coincidences are determining if over a fixed predetermined number of transmitted pulses at least the predetermined percentage of reply-range gate coincidences is preset. In the illustrative embodiment the predetermined percentage is 50% and the fixed predetermined number is 16.

Thus in FIG. 9 counter 110 is a counter to 16 and counter 111 is a counter to 8. It is understood that counters 110 and 111 may be identical with only the appropriate number of stages being utilized in counter 111. The transmitted pulses are inputted to counter 110 while the reply-range gate coincidence are inputted to counter 111.

In operation of the circuit, if counter 111 counts to 8 before counter 110 counts to 16, flip-flop 115 is reset through one-shot multivibrator 114 and thus its output goes low to switch the system into track. At the same time counter 116 is cleared so that both counters 110 and 111 may begin counting pulses again. If, on the other hand, counter 110 reaches a count of 16 before counter 111 reaches a count of 8, counter 111 is cleared through one-shot multivibrator 112 and OR gate 113, and both counters 110 and 111 start counting again. While it has been found to be expedient to make the search/track decision on the basis of 16 transmitted pulses and to use 50% as the predetermined percentage, it is understood that these may be varied according to the goals of a particular system and are not to be construed in a limiting sense. The memory input to switch 115 is arranged to return the switch to search if no Latch Out outputs are detected within a predetermined period of time.

When the DME is not being mutiplexed the SET output of flip-flop 115 is fed to gates 50, 93 and 126 for operation as described above. However when the multiplexer of FIG. 4 is utilized then the search/track control output of the multiplexer is fed to gates 50, 93 and 126 instead of flip-flop output. Thus in FIG. 9 the search/track control output of the multiplexer is fed to CON PT. 1 which in turn is connected to gates 50, 93 and 126. Additionally, when the multiplexer of FIG. 4 is utilized the RESET or DME/RNAV flag output of the flip-flop is an input to the multiplexer. When the search/track signal goes low, referring to FIG. 8 all replies are forced through NAND gate 53 and are thus all combined with the range gate before further processing Additionally, referring to FIG. 10 an input to NAND gate 93 goes low thus causing the cycle sequencer to switch to a two-cycle instead of a three-cycle sequence.

FIG. 12 is a block diagram of the range gate change of position detector and the groundspeed voltage generator. The range gate change of position detector is comprised of JK multivibrators 120, 122 and 123, AND gate 121, NAND gates 124 and 125, and inverter 137. Basically, the change of position detector tracks the range gate by comparing the time occurrence thereof with the 809.1 kilocycle clock pulses, each one of which is indicative of 1/10th of a mile, and outputting a signal indicative of the facts that the range gate has traveled 1/10th of a mile each time the range gate is coincident with a new clock pulse. Additionally, the particular configuration of circuitry utilized prevents jitter in the range gate from providing false tenth of a mile output signals. When the multiplexer of FIG. 4 is used the groundspeed is detected only on the primary channel during track.

The operation of the change of position detector of FIG. 12 is described in conjunction with the waveform diagram of FIG. 14. The 809.1 kilocycle clock signal denoted as B in FIGS. 9 and 10 is inputted to the clock input of multivibrator 120. Since the J and K inputs of the multivibrator are tied together, it acts as a divide by two unit, the Q output changing state each time the clock input is pulsed. The Q output of the multivibrator is either the wave form $D_1$, or the waveform $D_2$, which is the inverse of $D_1$, depending on the initial state of the multivibrator determined by the respective polarities of the present and clear inputs thereof. As long as the Q and Q outputs of multivibrator 123 remains in the same state, the same output of multivibrator 120, either $D_1$ or $D_2$, will occur. When multivibrator 123 is clocked, the outputs thereof will change state and the output of multivibrator 120 will change from $D_1$ to $D_2$, or vice versa. This is because the Q and $\overline{Q}$ outputs of multivibrator 123 are connected respectively to one input of NAND gates 124 and 125, the other input of both gates being the inverted cycle switch signal which is the inverse of waveform A of FIG. 14. The outputs of gates 124 and 125 are connected respectively to the preset and clear inputs of multivibrator 120, thus controlling the state that the multivibrator will assume on the next clock pulse.

The Q output, $D_1$ or $D_2$ of multivibrator 120 is ANDed in gate 121 with the clock pulse signal, thus producing signals having a waveform of either $E_1$ or $E_2$, depending upon whether $D_1$ or $D_2$ was inputted to the AND gate. As will be seen by referring to FIG. 14 the waveform $E_1$ is a waveform comprised of the first, third, fifth, seventh, etc. of the clock pulses of waveform B, and waveform $E_2$ is comprised of the second, fourth, sixth, eighth, etc. clock pulse of waveform B.

Multivibrator 122 can only toggle when the J input is high during the leading edge of the range gate, which is inputted to the clock input of the multivibrator. The range gate is denoted as waveform C in FIG. 14. Assuming that the waveform $E_1$ is present at the output of gate 121 and the range gate occurs as shown in FIG. 14, it is seen that multivibrator 122 will not toggle because the J input is not high at the time of occurrence of the leading edge of the range gate. As, however, the range gate moves out in succeeding cycles, the leading edges thereof will eventually occur when pulse P, shown in FIG. 14 is high. Thus the Q output of multivibrator 122 will change state indication that 1/10th of a mile has been traversed and since it is connected to the clock input of multivibrator 123 will cause the outputs of that multivibrator to change state thus changing the output of AND gate 121 from $E_1$ and $E_2$ and thus ensuring that jitter in the range gate will not cause erroneous output signals to occur. The tenth of a mile signals are inhibited by inhibit gate 126 from passing through to the groundspeed voltage generator until the system switches to track.

The groundspeed voltage generator in FIG. 12 is comprised of one-shot multivibrator 127, buffer 128, analog switches 138 and 139, delay network 137, operational amplifier 133, capacitors 132 and 134, and resistors 129, 130, 131, 135, 140 and 141 and groundspeed indicator 136. The tenth of a mile signals are fed from NOR gate 126 to one-shot multivibrator 127 where they are converted into pulses of standard width, shown at the output of multivibrators 127 in FIG. 14. As indicated above, smoothing of the range gate position in filter 107, shown in FIG. 9 provides for a relatively smooth change of position signal which is not affected by erratic changes.

The duty cycle of the output pulse train of the multivibrator is proportional to groundspeed and basically the ground-speed generator in an integrating filter which integrates the pulses over a time period to provide a voltage value which is proportional to groundspeed. The groundspeed voltage generally also includes an initializing means which forces the output of the generator to some value preset by resistor 141 at the time of installation of the unit into the aircraft and which represents the average cruising speed thereof. Use of the initialization means permits the acquisition of accurate groundspeed data more rapidly than would otherwise be possible and also provides a groundspeed value which is displayed while the system is in search.

The groundspeed integration is performed by a double pole active low pass filter which is comprised of operational amplifier 133, capacitors 132 and 134 and resistors 129, 130, 131 and 135. During search the output of the search/track switch is high and the input to delay network 137 and to analog switches 138 and 139 is low. The analog switches are arranged to be closed when the input thereto is low and therefore while the system is in search switch 138 shorts capacitor 134 and switch 139 connects resistors 140 and 141 to the input of the operational amplifier.

The shorting of capacitor 134 isolates the output of buffer 128 from the input of the operational amplifier and since switch 139 is closed, the input to the amplifier is the initial groundspeed set on resistor 141. The relative values of the resistors of the filter are arranged so that in the initialization state with switches 138 and 139 closed the time constant is greatly reduced and the filter acts substantially as an amplifier. The initialization voltage set on resistor 141 is amplified in amplifier 133 (may have a gain of one) and is displayed on groundspeed indicator 136.

When the system switches to track, delay network 137 provides approximately a 15 second delay during which the initialized value is held. This delay can be changed and adjusted to suit individual system requirements. At the end of this time the output of delay network 137, which is fed to the inputs of analog switches 138 and 139, goes high thus opening the switches. The opening of switch 138 effectively re-connects capacitor 134 in the circuit and places the output of buffer 128 across the input to the filter. Since capacitor 134 had been shorted, when switch 138 is open there is no initial charge on the capacitor 134 which might leak into the rest of the circuit. Openings of switch 139 effectively disconnects the initial voltage value set on resistor 141 from the filter input. Hence after the end of the 15 second delay the change of range gate position data is integrated in the filter and the integrated level is fed to groundspeed indicator 136 where it is displayed.

The multiplexer of the invention, shown in FIG. 4, will now be described. The inputs and outputs to the multiplexer are shown at the left hand part of FIG. 4 and the primary and secondary distance displays are shown at the bottom of the Figure.

Referring to the inputs and outputs, the NAV SEC address output is fed to address line 488 of secondary channel selector 476 shown in FIG. 3 and the NAV PRIM address output is fed to address line 487 of primary channel selector 475. The DME/RNAV flag input is connected to the DME/RNAV flag line output of R/S flip-flop 115 shown in FIG. 9. The latch out input is connected to the latch out output line of latch one-shot multivibrator 200 shown in FIG. 10. The To S/T control output is connected to CON PT 1 (connection point 1) shown in FIG. 9 and the DISABLE RAMP SAMPLE output is connected to switch 350 in FIG. 10. The RANGE DATA OUT input is fed from gate 201 in FIG. 10 and the XMIT pulse input is the transmitted pulse or a pulse derived therefrom.

Each of the primary and secondary distance display means 317 and 318 may comprise a circuit arrangement as shown in FIG. 13. Additionally, each of units 317 and 318 includes a memory which is effective to hold the displayed distance for up to a predetermined period of time. This memory may, for instance, merely be a retriggerable one-shot multivibrator which is set when a new distance value is displayed and which is arranged to time out is not retriggered at the end of a predetermined period of time. In the alternative, if an appropriate display means were utilized. the memory could conceivably be a memory internal to the display. Additionally, as indicated above and as shown in FIG. 3, the groundspeed is derived only from primary channel information in track. While a groundspeed display is not shown in FIG. 4, it may comprise a separate display means.

The basic function of the multiplexer is to cause the DME to switch from the primary channel to the secondary channel and vice versa at appropriate times and to ensure that the primary channel distance data is displayed on the primary display means and that the secondary channel distance data is displayed on the secondary display means. Additionally, the multiplexer is operative to allow the DME to go into and remain in track on the primary channel, notwithstanding the multiplexing.

When the unit is turned on, search/track switch 115 in FIG. 9 will be in search and the DME/RNAV flag input to the multiplexer is low. J/K flip-flop 309 is arranged so that the Q output is low when the clear input is low and so that the Q output changes state when the clock input is toggled provided that the clear input is high. Thus, at the start of operation with the clear input low, the Q output is low, inputs 1 and 2 to NAND gate 310 are low and the output of NAND gate 310 is high. Thus, the input to the base of switching transistor 302 is high and the transistor is turned on, thus addressing the NAV PRIM address line. The channel selectors are arranged so that they are addressed when their address lines are grounded. Correspondingly, at this time, the output of NAND gate 313 is low and transistor 301 is therefore in the off state, meaning that the secondary channel selector is not addressed.

Input 1 to NAND gate 311 is high while input 2 is low. Thus, the output of the gate, which is connected to the TO S/T CONTROL output is high. As indicated above, this output is connected to CON PT 1 in FIG. 9 and controls whether the DME is placed into search mode operation or the track mode operation. In the present case, since the output is high, the system is in search mode operation which is appropriate for beginning operation.

When two successive coincidences (or other distance output signal criteria in a different specific DME) are or is detected, a latch-out signal is generated. As discussed in conjunction with FIG. 13 RANGE DATA OUT counting pulses are fed into both the primary and secondary display means, but the counts in counters of the display means (e.g. counters 210 to 213 in FIG. 13) are not latched or displayed until a latch out pulse is generated. When the system is addressing the primary navigation channel during the search mode that is being discussed, input 1 to NAND gate 314 is high and when the latch out pulse occurs, it is fed to input 2 of gate 314 and the output of the gate goes low, causing the output of gate 316 to go high, thus inputting a latch out pulse to the primary display means which displays the detected distance. The latch out pulse is prevented from being inputted to the secondary display means because input 1 to NAND gate 312 is low and therefore at the occurrence of the latch out pulse the output of this gate is high and the output of gate 315 which is fed to the secondary display means is low.

When the track criteria is met and flip-flop 115 changes state the DME/RNAV flag input to the multiplexer goes high, thus enabling flip-flop 309 for toggling operation, thus input 2 to NAND gate 311 goes high and the output of NAND gate 311 which is connected to the TO S/T CONTROL output line goes low, thus placing the DME into track operation.

When the next latch out pulse occurs (the first latch out pulse in track), the distance corresponding thereto is displayed on the primary display means and the pulse causes the DME to be switched to the secondary channel. Thus the latch out pulse, which is inputted to the clock input of flip-flop 309, toggles the flip-flop thus causing the Q output thereof to go high. Thus, both inputs to NAND gate 310 are now high and the output thereof goes low, thus turning transistor 302 off and stopping the addressing of the primary channel selector. Correspondingly, the output of NAND gate 313 goes high, thus turning transitor 301 on and causing the NAV SEC ADDRESS output to be grounded. At the same time, transistor 303, the base of which is connected to the output of NAND gate 13 is turned on, thus addressing the DISABLE RAMP SAMPLE output line which is effective to turn switch 350 in FIG. 10 off and to disable the ramp sample while the system is operating on the secondary channel. Since the ramp sample pulse is disabled when the system is operating on the secondary channel, the range gate analog voltage generated when the system was operating on the primary channel is held. Thus, when the system is returned to the primary channel, it may be returned thereto in the track mode, and the range gate voltage will be approximately the same.

Toggling of the flip-flop makes input 1 of NAND gate 311 go low and causes the output to be switched high, causing the S/T output to be switched to the search mode which is appropriate for the secondary channel.

Means is also provided for switching the system back onto the primary channel if a latch out pulse is not generated on the secondary channel within a predetermined period of time. One of the reasons for this is that the analog range gate voltage value can only be held for a certain time and if this value is lost it is not possible to return the DME to the primary channel in track. The means provided is resettable one-shot multivibrator 320 which is set when transistor 303 is turned on. The multivibrator is arranged to output a signal at output 321 at the end of the predetermined period of time after being set, which is 3 to 5 seconds in an actual embodiment, unless before the end of the time period it is inhibited by a signal at the inhibit input. A latch out pulse occurring before the end of the predetermined interval is effective to inhibit the one-shot multivibrator output, such a latch out pulse itself being effective to switch the system back into primary channel operation. If a latch out signal does not occur within the predetermined time interval, then the multivibrator generates a signal at output 321 which is fed to the clock input of flip-flop 309 for toggling the flip-flop and causing the system to switch into primary channel operation.

If a latch out signal does occur within the predetermined time interval, then it is fed to inputs 2 of both gates 312 and 314. Since the Q output of flip-flop 309 is now high, the output of gate 312 goes low, and the output of gate 315 goes high, thus inputting a latch out pulse to the secondary distance display means for distance display.

Correspondingly, since input 1 to NAND gate 314 is low, the output of gate 314 at the occurrence of the latch out pulse is high, and the output of NAND gate 316 is low, and no signal is fed to the primary distance display means 317.

When the system switches back into primary channel operation, input 1 of NAND gate 311 goes high. Since input 2 of NAND gate 311 is already high, the output of NAND gate 311 goes low, and track operation in the primary channel is resumed.

Thus the multiplexer disclosed in FIG. 4 is operative to switch the DME from primary to secondary channel operation and to return the DME to the primary channel in track.

Further, while I have described an illustrative embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A system for time multiplexing a DME transmitter-receiver between a plurality of channels corresponding to different ground stations comprising, a DME transmitter-receiver, a plurality of channel selection means, each one comprising a means for selecting a channel, a plurality of display-memory means equal in number to said plurality of channel selection means, each selection means having a display-memory means corresponding thereto, multiplexing means for causing said DME to be time shared between the channels selected by said selection means, and for causing distance data output by said DME while operating on each of said channels to be displayed on and stored in the display-memory means corresponding to the channel selection means which selected the channel.

2. The system of claim 1 wherein said plurality of channel selection means comprises two channel selection means.

3. The system of claim [2] *1* wherein said multiplexing means includes means for switching said DME from one of said channels to [the other] *another* in response to output of distance data by the DME.

4. The system of claim [3] *2* wherein said channels are denoted as first and second channels and wherein said [means for switching] *multiplexing means* comprises means for switching said DME to said second channel and for enabling the display-memory means corresponding to the channel selection means selecting said second channel when said DME outputs distance data on said first channel.

5. The system of claim [4] *1* wherein each of said channel selection means comprises an encoder means having a switch means for changing the code encoded, each code corresponding to a different channel, and an address input which when addressed will cause said encoder means to output said code.

6. The system of claim 5 further including frequency synthesizer means for generating a frequency for controlling the frequency of transmission and receipt of said DME, the outputs of said encoder means being connected to said synthesizer means to control the frequency generated.

7. The system of claim [4] *1* further including timing means for causing said DME to switch channels a predetermined time after said timing means is set unless it is reset before the predetermined time elapses, said timing means being set and reset by the distance data output signals of the DME.

8. The system of claim [2] *1* wherein said DME operates and provides distance data output signals in both search and track modes, *a first* one of said channels being denoted as the primary channel and [the other] *a second one of said channels being denoted* as the secondary channel, said multiplexing means including means for allowing said DME to go into both search and track while operating on the primary channel, but only into search while operating on the secondary channel.

9. The system of claim 8 wherein said DME generates a range gate which is coincidence gated with incoming replies in track, further including means for ensuring that said range gate remains in the position established during track on said primary channel when said DME is operating on said secondary channel.

10. The system of claim [9] *8* further including means for causing said DME to be in track upon return to primary channel operation from secondary channel operation.

11. The system of claim 9 wherein said range gate is up-dated by a ramp sample pulse when said DME is in track, and wherein said means for ensuring that said range gate remains in the position established during track on said primary channel comprising means for disabling said ramp sample pulse while on said secondary channel.

12. The system of claim 8 wherein said multiplexing means includes first means for switching said DME from primary channel operation to secondary channel operation when said DME goes into track on said primary channel.

13. The system of claim 12 wherein said multiplexing means further includes second means for switching said DME from secondary channel operation to primary channel operation when distance data output is produced by said DME in search on said secondary channel.

14. The system of claim 13 wherein said multiplexing means further includes means for switching said DME to primary channel operation a predetermined time after it was switched to secondary channel operation if distance data output is not produced before said predetermined time ends.

15. The system of claim [14] *13* wherein said first and second means for switching includes a flip-flop which is clocked by said distance data outputs of said DME, said flip-flop being arranged so that its output states change when clocked.

16. A method for time multiplexing a DME transmitter-receiver between [two] *a plurality of* selected channels corresponding to [two] *different* ground stations and [two] *a like plurality of* display-memory means corresponding thereto, comprising the steps of selecting said [two] *plurality of* channels, causing said DME to operate on one of said [two] *plurality of* channels, displaying the distance data output of the DME on said one channel on the display-memory means corresponding thereto, when said distance data output occurs, switching said DME to operate on [the other] *another* of said [two] *plurality of* channels, displaying the distance data output on said other channel on the display-memory means corresponding thereto, and when said distance data output on said other channel occurs switching said DME back to operate on said one channel.

17. The method of claim 16 wherein said DME is switched to said other channel from said one channel or to said one channel from said other channel at a predetermined time after being switched to said one channel or to said other channel if a distance data output does not occur before the end of said predetermined time.

18. A method of time multiplexing a DME transmitter-receiver which provides distance data outputs in both search and track modes between primary and secondary channels and display-memory means corresponding thereto, comprising the steps of, selecting the frequencies of said primary and secondary channels, operating said DME on said primary channel until a distance data output in track occurs, displaying said distance data output on the display-memory means corresponding to said primary channel, when side output occurs switching said DME to said secondary channel, operating said DME on said secondary channel until either a distance data output in search occurs or a predetermined time after being switched onto the secondary channel ends, if said distance data output has occurred displaying it on the display-memory means corresponding to said secondary channel, and when either said output in search or the end of said predetermined time occurs switching said DME back to said primary channel.

19. The method of claim 18 wherein when said DME is switched back to said primary channel it is in track.

20. The method of claim [19] *18* wherein said DME is of the type which generates a range gate which is coincidence gated with incoming replies in track and wherein the position of said range gate established during track doesn't change when said DME is operating on said secondary channel.

* * * * *